June 15, 1948.     F. E. STRATTON     2,443,278
INDEXING MECHANISM

Filed March 24, 1943     4 Sheets-Sheet 1

June 15, 1948. F. E. STRATTON 2,443,278
INDEXING MECHANISM
Filed March 24, 1943 4 Sheets-Sheet 3

INVENTOR
Frank E. Stratton
By his attorney

June 15, 1948.  F. E. STRATTON  2,443,278
INDEXING MECHANISM
Filed March 24, 1943  4 Sheets-Sheet 4

INVENTOR
Frank E. Stratton
By his attorney

Patented June 15, 1948

2,443,278

UNITED STATES PATENT OFFICE 2,443,278

INDEXING MECHANISM

Frank E. Stratton, Beverly, Mass., assignor to United Shoe Machinery Corporation, Flemington, N. J., a corporation of New Jersey Application March 24, 1943, Serial No. 480,355

24 Claims. (Cl. 192—139)

This invention relates to indexing mechanisms and particularly to mechanisms of this type which are fluid-pressure operated.

A principal object of the invention is to provide improved means for driving the member to be indexed so that the starting, accelerating, decelerating and stopping of the member, which constitutes an indexing cycle, may be smoothly and efficiently effected regardless of the mass of the member or speed of indexing. To this end, a feature of the invention resides in interposing a cyclically variable speed gearing between the indexing motor and the indexed member. This gearing has an output element for driving the member to be indexed which is adapted to start the member moving slowly and to accelerate it evenly, during the first half of the indexing cycle, and, during the last half of the indexing cycle, to decelerate the member gradually so that it is brought substantially to zero velocity at the end of the indexing cycle. In this way the load on the indexing motor is more evenly distributed, over the whole indexing cycle, and the shock on the indexing pin, at the end of the cycle, substantially eliminated. Preferably, the motor is controlled by means including an index pin that rides on an index cam driven by the member to be indexed. This cam is provided with a plurality of recesses, for receiving the index pin to hold the member in indexed position, and also with a plurality of intervening control surfaces for moving the pin to operate the control means. For augmenting the effect of the variable speed drive in accelerating and decelerating the member to be indexed, these control surfaces are so constructed and arranged that the motor runs at a high speed during the time the member is being accelerated and at a slow speed during the time the member is being decelerated.

A further object of the invention is to provide an improved indexing mechanism in which the minimum time interval between successive indexing cycles may be predetermined. With this purpose in view, and in accordance with a further feature of the invention, a member which is movable to withdraw the index pin from a recess of the index cam, to start the motor and thereby initiate an indexing cycle, is releasably connected to the pin and means associated with the pin are adapted to release this connection after the motor has been started. During the last part of the indexing cycle a timing device is started, and this timing device is arranged to restore the connection between the movable member and the pin, thus conditioning the indexing mechanism for the next indexing cycle, in a predetermined and variable time. More particularly, a manually movable member is provided for withdrawing the pin and this member is connected to the pin by means including a connecting member. Means are provided for moving this connecting member out of operative position, when the motor starts, and a latch holds it in this inoperative position until tripped by the plunger of a timing piston. The indexing pin is formed integrally with a valve member which, when the pin is withdrawn from a recess to start an indexing cycle, admits pressure fluid to the timing cylinder for moving the timing piston in one direction. Later in the indexing cycle, the valve member moves to a position for trapping the fluid in the timing cylinder and the piston is returned by a spring at a rate determined by the setting of an adjustable needle valve.

Other objects and features will appear in the following detailed description of the illustrative embodiment of the invention shown in the accompanying drawings and will be pointed out in the claims.

Figure 1:
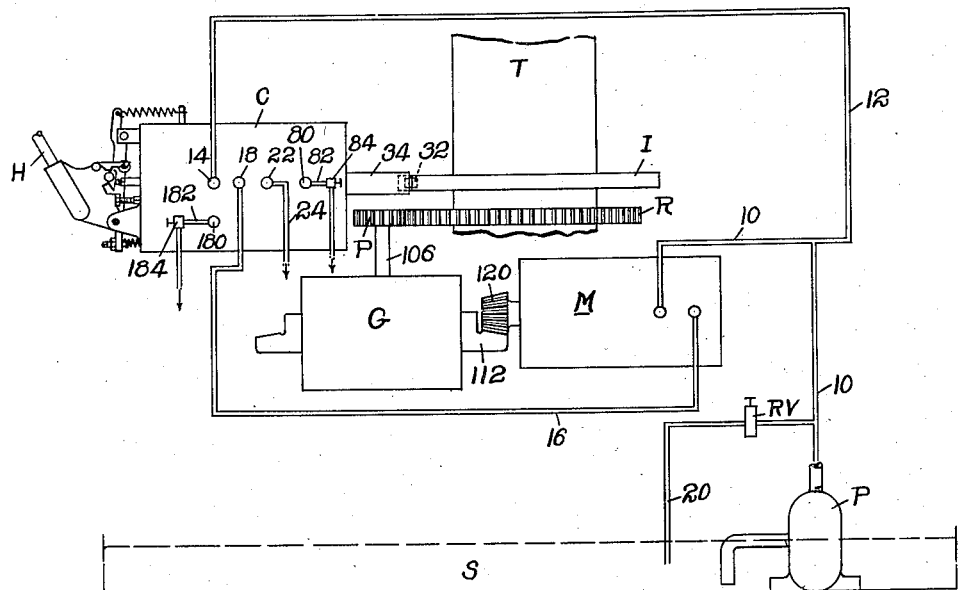
Fig. 1 is a diagrammatic showing of an apparatus embodying this invention.

Referring to Fig. 1, T designates the turret that is to be indexed and which, of course, will be suitably mounted for rotation upon the base of the machine with which it is associated. The turret is rotated by means of a rotary fluid-pressure motor M, which drives, through a cyclically variable speed gearing G, a pinion P that is in mesh with a ring gear R, secured to the turret. Pressure fluid for driving the motor is obtained from a pump P which draws liquid, such as oil, from a sump S, conveniently located in the base of the machine, and delivers the fluid under pressure to a line 10. Branching from the line 10 is a line 12 which leads to one connection 14 of a combined control valve and timing mechanism, designated generally by the reference character C. The line 10 leads to the inlet side of the motor M, as shown, and there is a line 16 leading from the exhaust side of the motor to a second connection 18 of the control valve C. For limiting the pressure in the system, a relief valve RV is connected in a branch line 20 leading from the line 10 to the sump. A third connection 22, of the control valve C, is likewise connected to the sump by means of a line 24.

Figure 2:
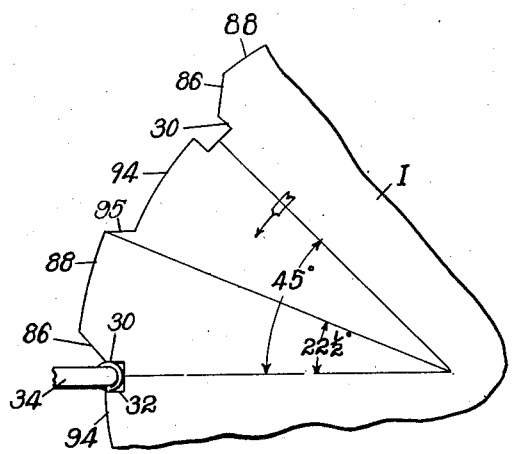
Fig. 2 is a plan view of a portion of an indexing cam forming part of the mechanism shown in Fig. 1.

Also secured to the turret is an indexing cam I that is provided with a plurality of notches, or recesses, 30 into which a roller 32, carried by an indexing pin 34, is adapted to project, see Fig. 2. As will be explained below, this pin serves to hold the turret in indexed position and also is acted on by the cam to operate the control valve C during the indexing action. The control valve has an operating handle H by means of which the pin 34 is withdrawn from a notch 30 for the purpose of initiating an indexing cycle.

Figure 3:
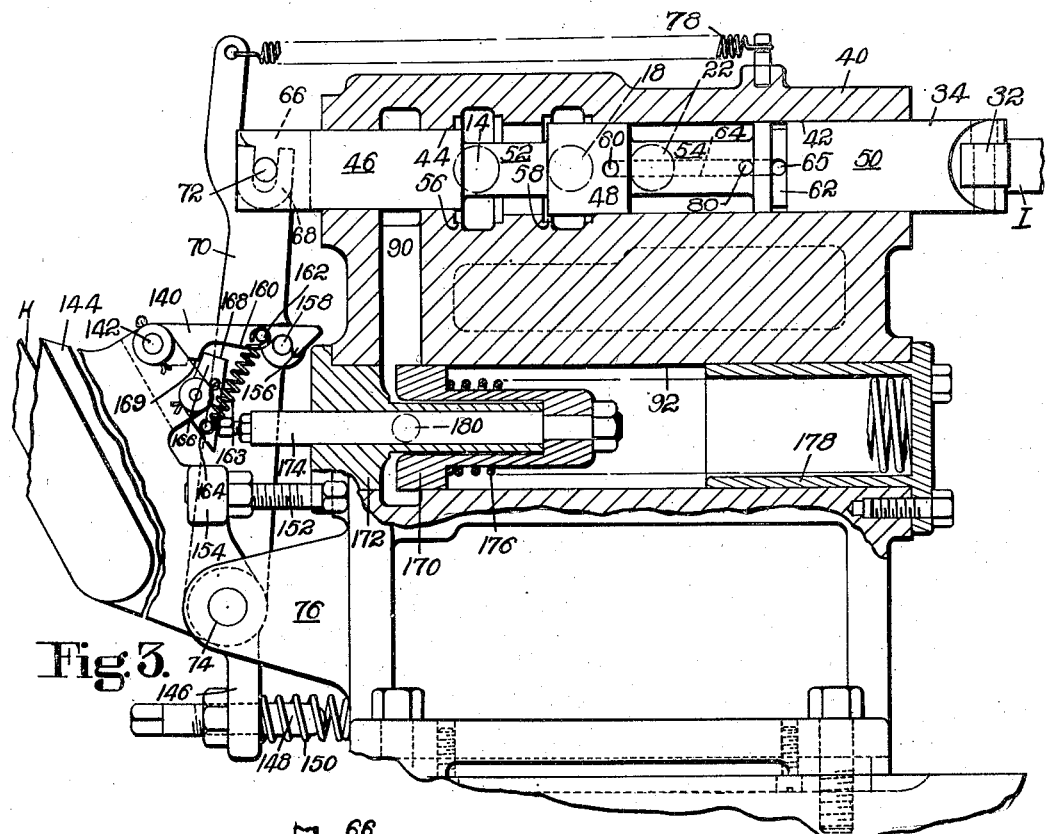
Fig. 3 is a side view, with certain parts in section, of a control valve for the indexing mechanism.
Figure 4:
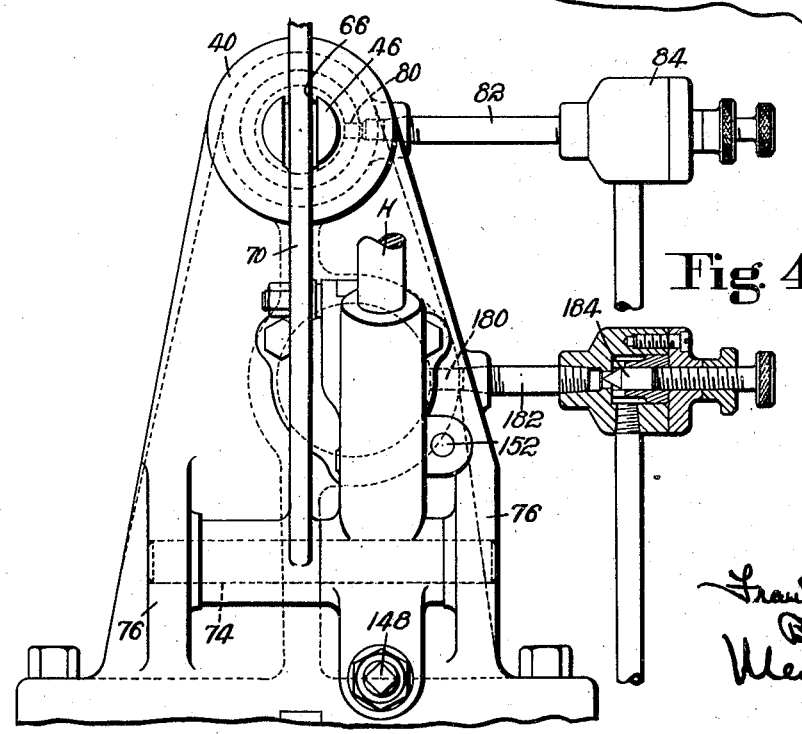
Fig. 4 is an end view of the control valve.

The control valve comprises a housing 40, Figs. 3 and 4, having an axially alined series of bores 42, 44, of different diameters, in its upper portion, with which the above-mentioned connections 14, 18 and 22 communicate. The pin 34 has spaced piston portions 46, 48 and 50, which are separated by reduced parts 52 and 54, respectively, that are slidably received in the aforementioned bores. The connections 14 and 18 open into grooves 56 and 58, formed in the larger bore 42, and the piston portion 48 is provided with a radial opening 60 that is connected to a groove 62, in the piston portion 50, by means of an axial duct 64 and radial bore 65. The piston portion 46 extends beyond the housing and is slotted at 66 to receive the bifurcated upper end 68 of an operating arm 70 that embraces a pin 72 carried by the piston portion. This arm is pivoted on a cross-shaft 74, mounted in ears 76 on the housing, Fig. 4, and is urged to swing in a clockwise direction to hold the roller 32 against the cam I, by means of a tension spring 78. A port 80 also opens into the bore 42 and to this port is connected a line 82, leading back to the sump, in which there is located a needle valve 84, Figs. 1 and 4, the purpose of which will presently appear.

In Fig. 3 the roller 32 is shown in engagement with the cam I in one of the notches 30, and the pin 34 in the position it occupies at the completion of an indexing cycle. The motor M will now be stalled inasmuch as pressure fluid is being admitted to both of its sides, to the inlet side from line 10 and to the exhaust side from line 12, connection 14, grooves 56, 58, connection 18, and line 16. Because of the difference in the areas of piston portions 46 and 48, the pin 34 is urged to the right by the action of fluid under pressure as well as by the spring 78. To start the motor, and thus initiate an indexing cycle, the pin 34 is moved to the left, by means of the handle H and mechanism about to be described, until the roller 32 is withdrawn from the notch 30 to a position opposite an inclined surface 86 on the cam, Fig. 2.

Figure 7:
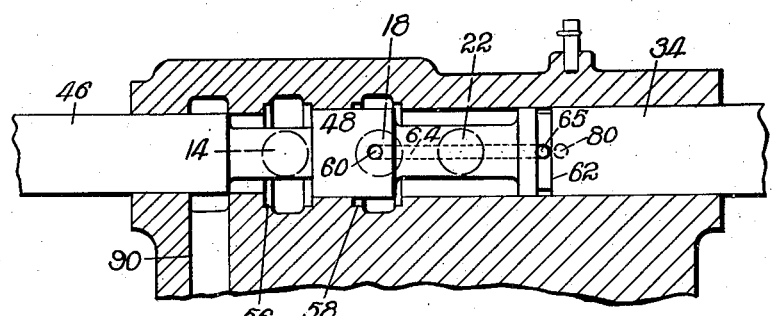
Figure 8:
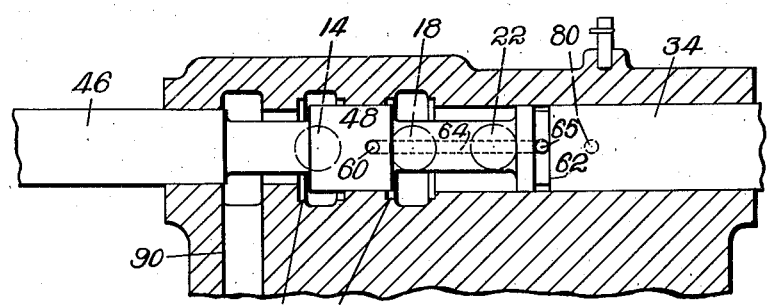

Fig. 7 shows the location of the piston portions when the pin is in this position. Now communication between groove 56 and groove 58 is blocked by the piston portion 48 which, however, uncovers the groove 58 so as to permit a restricted flow from the exhaust connection 18 to the sump connection 22. Exhaust now being permitted, the motor M starts and, through gearing G, rotates the turret T, together with cam I, in the direction of the arrow, Fig. 2. This movement of the cam causes the inclined surface 86 to act upon roller 32 and to drive the pin further to the left until the roller reaches a cylindrical portion 88 on the cam. The piston portions are thus brought to the position shown in Fig. 8 in which groove 58 is still blocked from groove 56 but is wide open to connection 22 through the space around the reduced part 54 and the motor runs at full speed. The connection 14 is now put into communication with a passage 90 which leads to a timing cylinder 92 formed in the housing, Fig. 3. As the turret continues to turn the roller 32 engages a drop 95 on the cam I, thus permitting the spring 78 to move the pin 34 back to the right until roller 32 engages a dwell 94 on the cam I.

Figure 9:
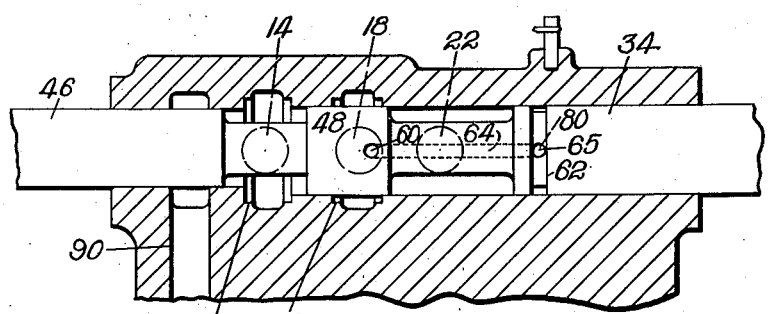

Fig. 9 shows the location of the piston portions when pin 34 is in this position. Groove 58 is wholly blocked by the piston portion 48 and passage 90 is likewise cut off from the connection 14. Now the radial duct 60 is over the groove 58 and the groove 62 is in alinement with the port 80. The motor M will now exhaust to the sump through line 82 and needle valve 84 and will run at a much reduced speed, determined by the setting of the valve 84, connection 18 being blocked from connection 22, as will be apparent, by piston portion 48. This slow speed motor operation continues until the roller 32 drops into the next notch 30, at which time the pin 34 returns to the position shown in Fig. 3, and the motor, as well as the turret rotation, is stopped. From the above it will be seen that the operation of the motor, after it has been started, has three different periods: first, a short period of acceleration, pin 34 in position of Fig. 7, and roller 32 on inclined cam surface 86; second, a period of uniform full-speed running, pin 34 in position of Fig. 8, and roller 32 on dwell 88; and third, a period of uniform slow-speed running, pin 34 in position of Fig. 9, and roller 32 on dwell 94. As will be explained below, these three periods are coordinated with the cyclic speed variation, obtained by the gearing G, in such a manner that the starting, accelerating, decelerating and stopping of the turret is facilitated, and undue loading on the motor, during starting, as well as shock on the indexing pin, when stopping, is avoided.

Figure 5:
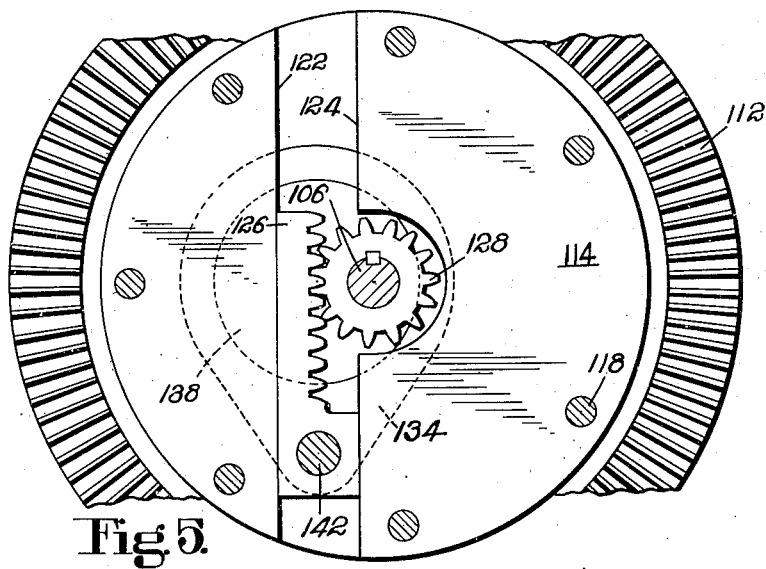
Fig. 5 is a plan view of a variable speed gearing, forming a part of the indexing mechanism, taken on the line V—V of Fig. 6, looking in the direction of the arrows.
Figure 6:
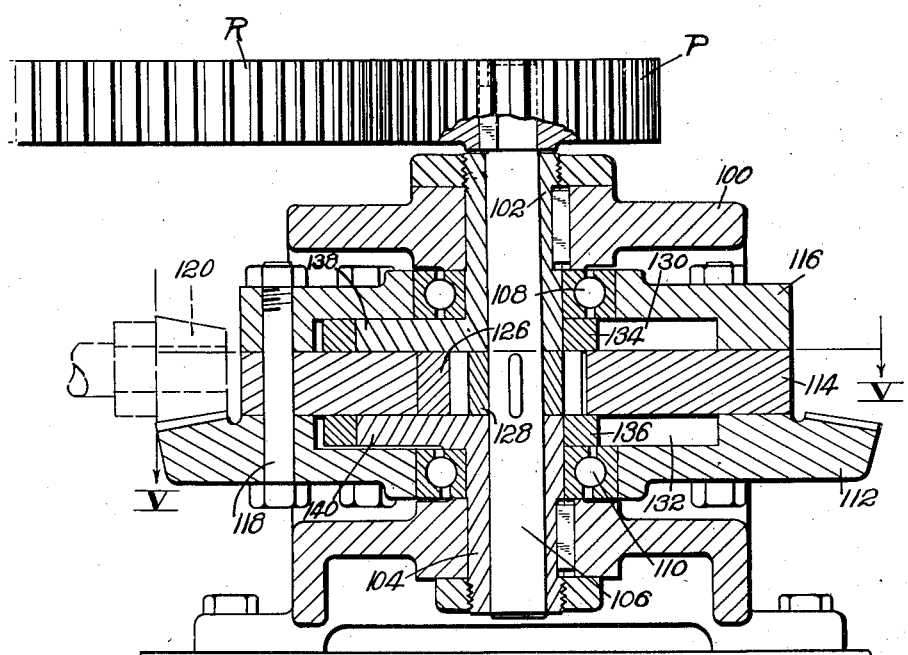
Fig. 6 is a sectional view of the variable speed gearing.

The gearing G is of the novel type disclosed and claimed in United States Letters Patent No. 2,309,595, granted January 26, 1943, on an application filed in the name of L. E. James, to which reference may be had for a more complete description and fuller explanation of the nature of this kind of mechanism. Referring to Figs. 1, 5 and 6, the gearing G comprises an open frame 100 in which there are fixed two bushings 102, 104. Journaled in these two bushings is a vertical shaft 106, to the upper end of which the pinion P is keyed. Rotatably mounted on these bushings, by means of ball bearings 108, 110, is an assembly comprising a bevel ring gear 112, a disc 114 and a plate 116, held together by bolts 118. The ring gear is in mesh with a bevel pinion 120 carried by the shaft of the motor M. The disc 114 is separated by an opening to provide opposed guide surfaces 122, 124 for a rack member 126 which is in mesh with a small pinion 128 that is keyed to the shaft 106. Ring gear 112 and plate 116 are each recessed at 130, 132, respectively, and located in these recesses are two eccentric straps 134, 136 which are rotatable on eccentric flanges 138, 140 formed integrally with the bushings 102, 104. These straps are each elongated on one side and are connected to the rack member 126, by means of a pin 142, at these points.

When the ring gear, which constitutes the input element of the gearing, is rotated a single turn, the shaft 106, on which pinion P, which constitutes the output element of the gearing, is mounted, will be driven and will also make one complete revolution. However, the drive from the ring gear to the shaft is through the rack member 126 which is reciprocated by the action of the eccentric straps. As a result of this, the angular velocity of the shaft 106 varies cyclically from zero to maximum, at the half turn, and then back to zero during each complete revolution. This action is fully explained in the above-mentioned patent and hence need not be further discussed here.

There are eight teeth in the ring gear R to every tooth in the pinion P, and therefore a single turn of the pinion will rotate the turret 45°, an amount equal to the angular distance between each succeeding notch 30, Fig. 2. As will be obvious, the number of cam notches and the gear ratio of pinion P and ring gear R may be varied to obtain any desired number of indexing cycles per turret revolution. The drop, from dwell 88 to dwell 94, on the turret cam occurs when the turret has rotated about one half of the distance to the next notch, 22½°, Fig. 2. Accordingly, during the first two periods of motor operation, indicated above, the speed of pinion P will be gradually accelerated from zero up to the same speed as ring gear 112, and, during the third period of motor operation, the speed of pinion P will be gradually decelerated, again reaching zero just when the roller 32 is in position to enter the next notch. The action of the control valve, to regulate the speed of motor M, and the action of the gearing G, to vary the speed of pinion P relative to the speed of ring gear 112, work together, since the motor runs at a high speed when the pinion is accelerating and at a low speed when the pinion is decelerating. As a result of this combined action, the turret is started very slowly, greatly relieving the heavy load which would otherwise be placed on the motor M; brought up to full speed quickly, as the accelerating action of gearing G occurs and with the motor M running at full speed; gradually decelerated by the gearing, while the motor M runs at a slow speed, due to the restricting of its exhaust by needle valve 84; and is finally brought to a stop by pin 34, at a time when its angular velocity has been reduced practically to zero by the continued decelerating effect of the gearing G.

For swinging the arm 70 to move the pin 34 into the position shown in Fig. 7, the handle H is provided with a pawl 140, Fig. 3. This pawl is pivoted on a pin 142 carried by a web 144, which extends from a socket portion, in which the handle fits, the web having a hub portion, journaled on the shaft 74, and a downwardly extending ear 146. A stop screw 148 is threaded through this ear, and surrounding this screw is a compression spring 150 which bears against the lower part of the housing 40. This spring holds the handle in the position shown in Fig. 3 and with a second stop screw 152, threaded through a projection 154 on the web 144, bearing against the housing. The pawl has a hook 156 for engaging a pin 158, carried by the arm 70, and adjacent to this hook is provided with a camming surface 160, the purpose of which will presently appear. The pawl is held in engagement with the pin 158 by a tension spring 163, stretched between a pin 162, in the pawl, and a pin 164 carried by one end of a latch 166 that is pivoted to the web 144. This latch has a surface 168 for engaging a surface 169, on the pawl, to hold the pawl up so that hook 156 is above the pin 158.

Located within the timing cylinder is a piston 170 having a plunger, or piston rod, 174, that extends out through a guide bushing 172. This piston is urged to the left, and against the end of the guide bushing, by means of a compression spring 176, and to the right by means of pressure fluid which is admitted to the cylinder through passage 90. Movement in the latter direction is limited by means of a stop sleeve 178 that closes the other end of the cylinder. A port 180 connects the left-hand end of the timing cylinder to the sump, through line 182 and a needle valve 184, see Fig. 4.

The stop screw 148 is adjusted so that movement of the handle H is limited to an amount which will bring the pin 34 to the position shown in Fig. 7. This will start the motor M, at a slow speed, and, when the turret starts to move, the handle will be released by the operator. The roller 32 will now be on the inclined cam portion 86 and pin 34 cannot return to the right but instead will continue to move to the left. Accordingly, the pin 158 will elevate the pawl, as the handle is returned to the position of Fig. 3, by the spring 150, and spring 163 will swing the surface 168 of the latch 166 beneath the surface 169 on the pawl. In this position the pawl hook 156 is above the pin 158 so that arm 70 and pin 34 are both free to move, under the action of spring 78 and the roller, to follow the cam T. When the roller reaches the dwell 88, pin 34 will be in the position shown in Fig. 8, and piston portion 46 will have moved to the left and uncovered passage 90 so that pressure fluid from connection 14 will enter this passage, and also cylinder 92, and the timing piston 170 will be moved to the right and against the stop sleeve 178.

As the indexing action proceeds, roller 32 soon will reach the dwell 94 and pin 34 will be shifted to the position shown in Fig. 9 and in which position the piston portion 46 will again cover the passage 90. Spring 176 now moves the piston 170 slowly to the left as the fluid in cylinder 92 is permitted to exhaust through the passage 180, line 182, and needle valve 184 to the sump. As the piston 170 returns to its original position, its rod 174 will strike the lower end of the latch 166 and will swing it in a clockwise direction, thus releasing the pawl 140 for return, by spring 163, into engagement with the pin 158. Until this happens, the operation of the handle H will not start another indexing cycle since the hook 156 clears the pin 158 so long as latch 166 is beneath the surface 169 on the pawl. By adjusting the needle valve 184 the speed of the return movement of the piston can be so regulated that the latch 166 will not be tripped until after the indexing cycle has been completed and, in this way, the minimum time interval between each succeeding indexing cycle can be variably predetermined.

This function is especially desirable when the mechanism is utilized for indexing the turret of a machine for applying pressure to shoe parts. The turrets of such machines are provided with a plurality of sets of pressure-applying devices which, as the turret is indexed successively to bring each of the sets of pressure-applying devices to a loading and unloading station, holds the parts under pressure. In such a machine the parts are held under pressure for the length of time it takes to index the turret a complete revolution. Accordingly, with the needle valve 184 so adjusted that the minimum time interval between indexing cycles multiplied by the number of indexing cycles per turret revolution is equal to, or slightly greater than, the minimum time it is desired to maintain the parts under pressure, it is impossible for an operator to index the machine too rapidly, and the holding of the parts under pressure for at least the minimum desired time is assured.

Having described my invention, what I claim as new and desire to secure by Letters Patent of the United States is:

1. An indexing mechanism comprising a member to be indexed, variable speed means having an output element operatively connected to the member and an input element, power-operated means for driving said input element, and control means for said power-operated means including a member movable manually to start said power-operated means in operation and, thereafter, movable automatically to control the speed of operation of said power-operated means.

2. An indexing mechanism comprising a member to be indexed, variable speed means having an output element operatively connected to the member and an input element, a motor for driving said input element, a control member movable to a plurality of positions for starting, stopping and determining the speed of operation of said motor, and means driven by the member to be indexed for moving the control member.

3. An indexing mechanism comprising a member to be indexed, variable speed means having an output element for driving said member and an input element, a fluid-pressure-operated motor for driving said input element, a valve member movable to a plurality of positions for starting, stopping and determining the speed of operation of said motor, and cam means driven by the member to be indexed for moving the valve member.

4. An indexing mechanism comprising a member to be indexed, variable speed gearing including an output element for driving said member and an input element, said gearing being so constructed and arranged that said member is started, accelerated to a maximum speed, decelerated and stopped, by said output element, power-operated means for driving the input element, means for controlling the speed of operation of said power-operated means, and means associated with said member for operating the controlling means.

5. An indexing mechanism comprising a member to be indexed, variable speed gearing including an output element for driving said member and an input element, said gearing being so constructed and arranged that said member is started, accelerated to a maximum speed, decelerated and stopped, by said output element, and power-operated means for driving the input element at a rate of speed variable in accordance with variations in the rate of speed imparted to said member by the output element.

6. An indexing mechanism comprising a member to be indexed, variable speed gearing including an output element for driving said member and an input element, said gearing being so constructed and arranged that said member is started, accelerated to a maximum speed, decelerated and stopped, by the output element, a motor for driving the input element, a control member movable to a plurality of positions for starting, stopping and determining the speed of operation of said motor, and means driven by the member to be indexed for moving the control member.

7. An indexing mechanism comprising a member to be indexed, variable speed gearing including an output element for driving said member and an input element, said gearing being so constructed and arranged that said member is started, accelerated to a maximum speed, decelerated and stopped, by the output element, a motor for driving the input element, and means for starting the motor in operation and for controlling its speed of operation in accordance with the rate of speed imparted to said member by the output element.

8. An indexing mechanism comprising a member to be indexed, variable speed gearing having an output element for driving the member and an input element, said gearing being so constructed and arranged that said member is started, accelerated to a maximum speed, decelerated and stopped by the output element, a fluid-pressure-operated motor for driving said input element, a valve member movable to a plurality of positions for starting, stopping and determining the speed of operation of said motor, and cam means driven by the member to be indexed for moving the valve member.

9. An indexing mechanism comprising a member to be indexed, a cyclically variable speed gearing having an output element for driving said member and an input element, said gearing being so constructed and arranged that said member is started, accelerated, decelerated and stopped, by the output element, a motor for driving the input element, means for controlling the operation of said motor, and means driven by the member to be indexed for operating the control means so as to cause the motor to run at a high speed when the output member is accelerating said member and at a slow speed when the output member is decelerating said member.

10. An indexing mechanism comprising a member to be indexed, a cyclically variable speed gearing having an output element for driving said member and an input element, said gearing being so constructed and arranged that said member is started, accelerated, decelerated and stopped by the output element, a fluid-pressure-operated motor for driving said input element, a valve member movable to a plurality of positions for starting, stopping and determining the speed of operation of said motor, and cam means driven by the member to be indexed for positioning said movable valve member, said cam means being adapted to position the valve member so that the motor runs at a high speed when the member is being accelerated and at a slow speed when the member is being decelerated.

11. An indexing mechanism comprising a member to be indexed, variable speed gearing having an output element for driving the member and an input element, a motor for driving the input element, control means for the motor, an indexing pin operatively connected to the control means, a cam driven by the member, said cam having a plurality of recesses, for receiving the pin to hold the member in indexed position, and a plurality of intervening control surfaces, for moving the pin to operate the control means, and means for withdrawing the pin from a recess to start the motor and thus initiate an indexing cycle.

12. An indexing mechanism comprising a member to be indexed, variable speed gearing having an output element for driving the member and an input element, a fluid-pressure-operated motor for driving the input element, valve means for controlling the motor including a shiftable valve member, an indexing pin operatively connected to the shiftable valve member, a cam driven by the member to be indexed, said cam having a plurality of recesses, for receiving the pin to hold the member in indexed position, and a plurality of intervening control surfaces for moving the pin and thereby to shift the valve member, and means for withdrawing the pin from a recess to start the motor and thus initiate an indexing cycle.

13. An indexing mechanism comprising a member to be indexed, variable speed gearing having an output element for driving the member and an input element, said gearing being so constructed and arranged that the member is started, accelerated, decelerated and stopped by the output element, a motor for driving the input element, control means for the motor, an indexing pin operatively connected to the control means, a cam driven by the member, said cam having a plurality of recesses for receiving the pin to hold the member in indexed position, and a plurality of intervening control surfaces, for moving the pin to operate the control means so that the motor runs at a high speed when the member is being accelerated and at a slow speed when the member is being decelerated, and means for withdrawing the pin from a recess to start the motor and thus initiate an indexing cycle.

14. An indexing mechanism comprising a member to be indexed, variable speed gearing having an output element for driving the member and an input element, said gearing being so constructed and arranged that the member is started, accelerated, decelerated and stopped by the output element, a fluid-pressure-operated motor for driving the input element, valve means for controlling the motor including a shiftable valve member, an indexing pin operatively connected to the shiftable valve member, a cam driven by the member to be indexed, said cam having a plurality of recesses, for receiving the pin to hold the member in indexed position, and a plurality of intervening control surfaces, for moving the pin to shift the valve member so that the motor runs at a high speed when the member is being accelerated and at a slow speed when the member is being decelerated, and means for withdrawing the pin from a recess to start the motor and thus initiate an indexing cycle.

15. An indexing mechanism comprising a member to be indexed, variable speed gearing having an output element for driving the member and an input element, a motor for driving the input element, control means for the motor, an indexing pin operatively connected to the control means, a cam driven by the member, said cam having a plurality of recesses, for receiving the pin to hold the member in indexed position, and a plurality of intervening control surfaces, for moving the pin to operate the control means, yieldable means for holding the pin against the cam, manual means for withdrawing the pin from a recess to start the motor, and means for disconnecting the pin from said manual means after the motor has started.

16. An indexing mechanism comprising a member to be indexed, variable speed gearing having an output element for driving the member and an input element, a fluid-pressure-operated motor for driving the input element, valve means for controlling the motor including a shiftable valve member, an indexing pin operatively connected to the valve member, a cam driven by the member, said cam having a plurality of recesses, for receiving the pin to hold the member in indexed position, and a plurality of intervening control surfaces, for moving the pin to shift the valve member, yieldable means for holding the pin against the cam, manual means for withdrawing the pin from a recess to start the motor, and means for disconnecting the pin from said manual means after the motor has started.

17. An indexing mechanism comprising a member to be indexed, a motor for driving the member, control means for the motor including an indexing pin, a cam driven by the member and having a plurality of recesses, for receiving the pin to hold the member in indexed position, and a plurality of intervening control surfaces, for moving the pin to operate the control means, yieldable means for holding the pin against the cam, manual means for withdrawing the pin from a recess to start the motor, and means for disconnecting the pin from the manual means after the motor has started.

18. An indexing mechanism comprising a member to be indexed, a motor for driving the member, control means for the motor including an indexing pin, a cam driven by the member and having a plurality of recesses, for receiving the pin to hold the member in indexed position, and a plurality of intervening control surfaces, for moving the pin to operate the control means, yieldable means for holding the pin against the cam, a manually movable member, means for connecting said manually movable member to the indexing pin for manually withdrawing the pin from a recess to start the motor, and means for rendering the connecting means inoperative after the motor has started.

19. An indexing mechanism comprising a member to be indexed, an indexing motor, control means for the motor including an indexing pin, an indexing cam having a plurality of recesses for receiving the pin to hold the member in indexed position, said control means being constructed and arranged to stop the motor when the pin is in a recess and to start the motor when the pin is withdrawn from a recess, yieldable means for holding the pin against the cam, a manually movable member, means for connecting the manually movable member to the pin for manually withdrawing the pin from a recess to start the motor, means for rendering the connecting means inoperative each time the motor is thus started and again operative at a predetermined time after the pin has entered the next succeeding recess and the motor stopped.

20. An indexing mechanism having a member to be indexed, an indexing motor, control means for the motor including an indexing pin, an indexing cam having a plurality of recesses, for receiving the pin to hold the member in indexed position and for positioning the control means for stopping the motor, and a plurality of intervening control surfaces, yieldable means for holding the pin against the cam, an operating member movable to withdraw the pin from a recess to start the motor, a releasable connection between the operating member and the pin, means for releasing the releasable connection after the motor has started, and means for restoring the connection a predetermined time after the pin has entered the next succeeding recess.

21. An indexing mechanism comprising a member to be indexed, an indexing motor, control means for the motor including an indexing pin and an indexing cam, said cam having a plurality of recesses, for receiving the pin to hold the member in indexed position and to stop the motor, and a plurality of intervening control surfaces, yieldable means for holding the pin against the cam, a movable member for withdrawing the pin from a recess to start the motor, means for operatively connecting the movable member to the pin including a connecting member, means for shifting the connecting member to an inoperative position after the motor has started, and means for returning the connecting member to operative position a predetermined time after the motor has stopped.

22. An indexing mechanism comprising a member to be indexed, an indexing motor, control means for the motor including an indexing pin and an indexing cam, said cam having a plurality of recesses, for receiving the pin to hold the member in indexed position and to stop the motor, and a plurality of intervening control surfaces, yieldable means for holding the pin against the cam, a movable member for withdrawing the pin from a recess to start the motor and thereby initiate an indexing cycle, means for operatively connecting the movable member to the pin including a connecting member, means for shifting the connecting member to an inoperative position after the motor has been started, latch means for holding said connecting member in the inoperative position, means for tripping the latch a predetermined time after the index pin has entered the next succeeding recess, and means for returning the connecting member to operative position when the latch is tripped.

23. An indexing mechanism comprising a member to be indexed, an indexing motor, control means for the motor including an indexing pin and an indexing cam, said cam having a plurality of recesses, for receiving the pin to hold the member in indexed position and to stop the motor, and a plurality of intervening control surfaces, yieldable means for holding the pin against the cam, a movable member for withdrawing the pin from a recess to start the motor and thereby initiate an indexing cycle, means for operatively connecting the movable member to the pin including a connecting member, means for shifting the connecting member to an inoperative position after the motor has started, latch means for holding the connecting means in said inoperative position, a plunger for tripping the latch, means for holding the plunger away from the latch while the motor is running, and means for delaying the return of the plunger for a predetermined time after the motor has stopped.

24. An indexing mechanism comprising a member to be indexed, an indexing motor, control means for the motor including an index pin and an indexing cam, said cam having a plurality of recesses, for receiving the pin to hold the member in indexed position and to stop the motor, means for withdrawing the pin to start the motor including a connecting member, means for moving the connecting member to an inoperative position when the motor is started, a latch for holding the connecting member in said inoperative position, a cylinder, a timing piston in said cylinder and carrying a plunger, yieldable means for moving the piston in a direction to cause the plunger to trip the latch, valve means associated with the pin and adapted, when the pin is withdrawn from a recess, to admit pressure fluid to the cylinder for moving the piston in the opposite direction, to remove the plunger from the vicinity of the latch and, when the pin enters the next succeeding recess, to trap the pressure fluid in the cylinder, and an adjustable exhaust valve for discharging said cylinder so that the yieldable means may return the piston and cause said plunger to trip the latch.

FRANK E. STRATTON.

REFERENCES CITED

The following references are of record in the file of this patent:

UNITED STATES PATENTS

| Number | Name | Date |
|---|---|---|
| 1,111,411 | Smith | Sept. 22, 1914 |
| 1,552,598 | Drissner et al. | Sept. 8, 1925 |
| 1,833,822 | Brown | Nov. 24, 1931 |
| 1,911,599 | Bloxsom | May 30, 1933 |
| 1,949,097 | Armitage | Feb. 27, 1934 |
| 1,994,221 | Kearney et al. | Mar. 12, 1935 |
| 2,309,595 | James | Jan. 26, 1943 |
| 2,352,183 | Bullard, 3d | June 27, 1944 |